(12) United States Patent
Hansen et al.

(10) Patent No.: US 9,415,629 B2
(45) Date of Patent: Aug. 16, 2016

(54) METHOD OF WHEEL AND HUBCAP ADORNMENT OF LOGOS AND LETTERING

(71) Applicants: Albert Hansen, Puyallup, WA (US); Lisa Hansen, Puyallup, WA (US)

(72) Inventors: Albert Hansen, Puyallup, WA (US); Lisa Hansen, Puyallup, WA (US)

(*) Notice: Subject to any disclaimer, the term of this patent is extended or adjusted under 35 U.S.C. 154(b) by 267 days.

(21) Appl. No.: 13/965,378

(22) Filed: Aug. 13, 2013

(65) Prior Publication Data

US 2015/0047196 A1   Feb. 19, 2015

(51) Int. Cl.
*B21D 53/32* (2006.01)
*B60B 7/00* (2006.01)
*B60B 7/04* (2006.01)

(52) U.S. Cl.
CPC ............. *B60B 7/0033* (2013.01); *B60B 7/0053* (2013.01); *B60B 7/04* (2013.01); *B60B 2310/646* (2013.01); *B60B 2310/658* (2013.01); *B60B 2900/351* (2013.01); *Y10T 29/4954* (2015.01); *Y10T 29/49481* (2015.01); *Y10T 29/49492* (2015.01); *Y10T 29/49535* (2015.01)

(58) Field of Classification Search
CPC ...... B60B 7/0033; B60B 7/0053; B60B 7/04; B60B 2310/646; B60B 2310/658; B60B 2900/351; Y10T 29/49535; Y10T 29/49492; Y10T 29/49481
See application file for complete search history.

(56) References Cited

U.S. PATENT DOCUMENTS

| | | | |
|---|---|---|---|
| 5,876,108 A * | 3/1999 | Chien | 362/35 |
| 7,014,273 B1 * | 3/2006 | Yang et al. | 301/37.25 |
| 7,472,967 B2 * | 1/2009 | DoVale et al. | 301/37.25 |
| 2004/0130905 A1 * | 7/2004 | Olds et al. | 362/487 |

OTHER PUBLICATIONS

Garrett, Jerry; "A Farewell to Hubcaps", http://www.caranddriver.com/features/a-farewell-to-hubcaps, Jul. 2008, Car and Driver, picture 2 of 12 "Packard", http://www.caranddriver.com/photo-gallery/a-farewell-to-hubcaps#2.*

* cited by examiner

*Primary Examiner* — Ryan J Walters
(74) *Attorney, Agent, or Firm* — The Law Office of Jerry D. Haynes

(57) ABSTRACT

A method of adorning a wheel or hubcap including the steps of: placing a circular center piece onto a wheel or hubcap; surrounding the circular center piece with alternating curved sections; inserting an insignia onto the circular center piece; and placing lettering on the alternating curved sections, where the lettering comprises identifying information concerning the insignia. In one particular embodiment, the step of surrounding the circular center piece includes alternating the size of the alternating curved sections and further including the step of surrounding the curved sections with a solid rim. The step of placing lettering may include placing an outer circle of lettering and an inner circle of lettering.

4 Claims, 1 Drawing Sheet

METHOD OF WHEEL AND HUBCAP ADORNMENT OF LOGOS AND LETTERING

BACKGROUND OF THE INVENTION

1. Field of Invention

The present relation relates to a wheel or hubcap designed to display logo insignia and to further adorn the wheel or hubcap in a specific manner for the typical sports enthusiast.

2. Description of Related Art

Sports enthusiasts show their loyalty and spirit for their particular team in various manners. Many sports fans purchase replica uniforms and jerseys to show their team affiliation. Sports enthusiasts also purchase hats, caps, jackets, T-shirts and other paraphernalia to show their loyalty and interest in a particular sports team. The sports paraphernalia industry is quite large and involves a plethora of devices and clothing that may be adorned and decorated in a particular sports team's logo and colors. The paraphernalia can range from pins, desktop accessories, clocks, carpets, furniture, replica baseballs or replica footballs and a whole assortment of sports memorabilia. Consequently the market is enriched with an endless stream of sports memorabilia for the sports enthusiast.

Further sports enthusiasts have accessories and other attachments for their automobiles. Many times individuals will mount flags or place bumper stickers on their vehicle to display their particular sports team's insignia and logo. Also seat covers may be placed in the vehicle or other decorative means to show team spirit. Consequently, further designs are conceivable and are readily available for development. One attractive concept may involve a wheel or hubcap that includes a sports logo or sports team's symbols or insignia. Such a device could be very popular with sports enthusiasts and provide them an opportunity to provide yet another means of showing that team spirit.

SUMMARY OF THE INVENTION

The present invention relates to a method of adorning a wheel or hubcap comprising the steps of: placing a circular center piece onto a wheel or hubcap; surrounding the circular center piece with alternating curved sections; inserting an insignia onto the circular center piece; and placing lettering on the alternating curved sections, where the lettering comprises identifying information concerning the insignia. In one particular embodiment, the step of surrounding the circular center piece includes alternating the size of the alternating curved sections and further comprising the step of surrounding the curved sections with a solid rim. The step of placing lettering may include placing an outer circle of lettering and an inner circle of lettering.

DETAILED DESCRIPTION

Figure 1:
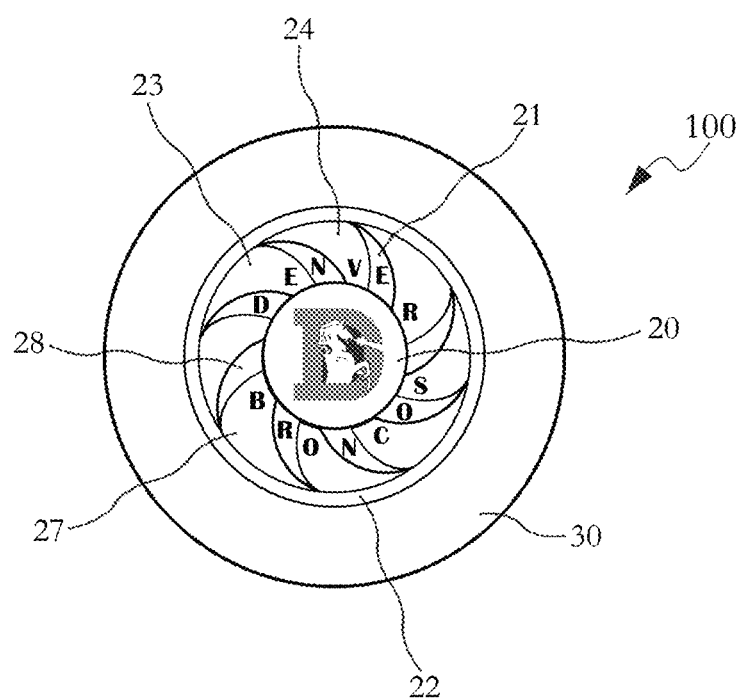
FIG. 1 depicts a view of a sports insignia wheel or hubcap in accordance with the present invention.

The present invention relates to a sports insignia wheel or hubcap that provides a means to display team spirit and to adorn a wheel or hubcap of a motor vehicle. The sports insignia wheel or hubcap according to present invention includes a centerpiece that displays the team insignia of the sports team. Further the sections around the sports insignia are used to place lettering associated with the sports team so that it revolves around the sports insignia at the centerpiece of the wheel or hubcap. This method of the wheel or hubcap adornment provides a means to display sports insignias and gives a sports enthusiast yet another avenue to show their team spirit and loyalty.

In reference to FIG. 1, a sports insignia wheel or hubcap according to the present invention is depicted. The sports insignia wheel or hubcap 100 includes a centerpiece 20. The centerpiece 20 as shown in FIG. 1 provides a means to display the sports insignia of the particular sports team.

In this particular embodiment displayed in FIG. 1, the DENVER BRONCOS™ team insignia is placed in the centerpiece 20. This BRONCOS™ insignia includes a horse leaping through a letter D. This insignia consequently may be interchanged with other popular insignias associated with sports teams such as the Dallas star for the DALLAS COWBOYS™, a NY for the NEW YORK YANKEES™, a REDSKINS™ insignia for the WASHINGTON REDSKINS™ and any other insignia associated with any other sports team. All aforementioned product names, logos, and brands are property of their respective owners. Use of these names, logos, and brands does not imply endorsement. This means of adorning the centerpiece may be easily utilized with any team because most teams include a particular insignia that is associated with the team. These insignias range from particular logos in combination with other pictures and depictions that may be associated with the team's insignia. Surrounding the centerpiece 20 is a plurality of curved sections. Lettering is placed within each section of the curved sections that is associated with the particular team's name. In this particular embodiment shown in FIG. 1 Denver Broncos is spelled through placement of appropriate lettering in the curved sections. Larger curved sections 23 are alternated with the smaller curved sections 28 along the outer perimeter of the centerpiece 20. A solid rim 22 surrounds the curved sections to complete the makeup of the wheel or hubcap 100. The wheel or hubcap may be utilized on any particular tire. As shown tire 30 includes the wheel or hubcap 100 in accordance with the present invention. Outer circle of lettering 23 spells out Denver and the inner circle of lettering 21 provides the team's name Broncos.

In making the wheel or hubcap 100, the insignia is placed on the centerpiece 20 and lettering is placed upon the alternating curved sections 28, 27. The insignia may be engraved into the centerpiece 20 or molded into this centerpiece. The sports insignia wheel or hubcap according to the present invention clearly provides a means to adorn and decorate a wheel or hubcap with a sports insignia and a particular sports franchise's name. The instant invention has been shown and described in what it considers to be the most practical and preferred embodiments. It is recognized, however, that departures may be made there from within the scope of the invention and that obvious modifications will occur to a person skilled in the art.

What is claimed is:

1. A method of adorning a wheel or hubcap comprising the steps of:
   a. placing a circular center piece onto a wheel or hubcap;
   b. surrounding the circular center piece with alternating curved sections, where the alternating curved sections radially extend from the circular center piece;
   c. inserting an insignia onto the circular center piece; and
   d. placing a single letter on each one of a grouping of the alternating curved sections, where the lettering comprises identifying information concerning the insignia.

2. The method of adorning a wheel or hubcap according to claim 1, wherein the step of surrounding the circular center piece includes alternating sizing of the alternating curved sections.

3. The method of adorning a wheel or hubcap according to claim 1, further comprising the step of surrounding the curved sections with a solid rim.

4. The method of adorning a wheel or hubcap according to claim 1, wherein placing the respective letters includes arranging an outer circle of lettering and an inner circle of lettering.

\* \* \* \* \*